United States Patent [19]
Blood et al.

[11] Patent Number: 5,270,508
[45] Date of Patent: Dec. 14, 1993

[54] ELASTOMERIC ARTICLE PROXIMITY SWITCH

[75] Inventors: Dennis C. Blood, North St. Paul; Gerald A. Baker, Fridley; Joseph T. Tousignant, Cottage Grove, all of Minn.

[73] Assignee: Independent Technologies, Inc., Eagan, Minn.

[21] Appl. No.: 888,747

[22] Filed: May 22, 1992

[51] Int. Cl.$^5$ ............................................. H01H 3/12
[52] U.S. Cl. .................................................. 200/513
[58] Field of Search ........................ 200/515, 513, 512

[56] References Cited

U.S. PATENT DOCUMENTS

| | | | |
|---|---|---|---|
| 3,717,737 | 2/1973 | Shimojo | 200/515 |
| 4,604,509 | 8/1986 | Clancy et al. | 200/513 |
| 4,814,561 | 3/1989 | Kawasaki | 200/513 |
| 4,851,626 | 7/1989 | Nagashima | 200/513 |
| 4,928,299 | 5/1990 | Tansky et al. | 379/37 |
| 4,947,416 | 8/1990 | Yoshioka et al. | 200/515 X |

FOREIGN PATENT DOCUMENTS 226904 7/1987 European Pat. Off. ............ 200/513
9202029 2/1992 World Int. Prop. O. .......... 200/513

OTHER PUBLICATIONS

Charles J. Murray, Design News, Sub-Miniature Switch Makes "Smart Phone" Smarter, Dec. 16, 1991, pp. 97–98.
Press release entitled "Rubber Keyboards", Source unknown.

Primary Examiner—Renee S. Luebke
Attorney, Agent, or Firm—Joel D. Skinner

[57] ABSTRACT

A switch comprising a printed circuit board, including at least two conductive paths arranged in a predetermined pattern on a first surface of the printed circuit board; a depressible elastomeric actuation structure connected to the printed circuit board and having a conductive contact constructed and arranged so that it establishes contact with and between each conductive path of the printed circuit board upon depression of the actuation structure; a pair of conductors connecting the conductive paths to an external electronic apparatus; and a mounting assembly to mount the printed circuit board to an external surface.

11 Claims, 4 Drawing Sheets

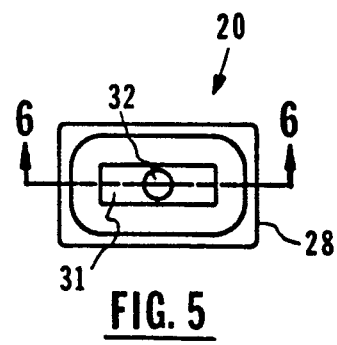
FIG. 5
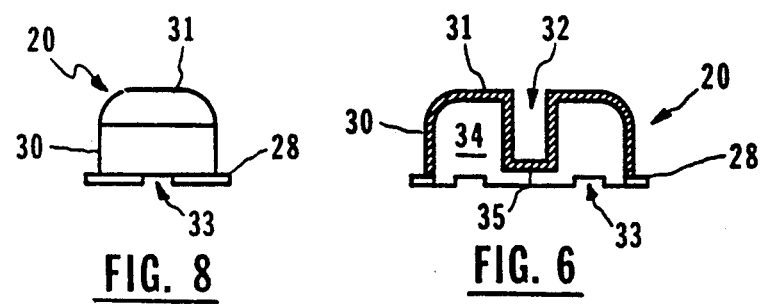
FIG. 8  FIG. 6
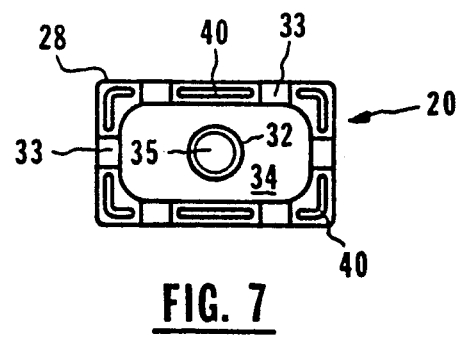
FIG. 7

ELASTOMERIC ARTICLE PROXIMITY SWITCH

BACKGROUND OF THE INVENTION

This invention relates to electrical switch apparatus and particularly to a low profile, elastomeric electrical contact switch. The switch device is particularly useful for electrically signaling the movement of an article which is normally in close proximity with the switch, for example the removal of a coin collection box from the box vault of a coin public telephone station for security and accounting purposes.

In the past, various switch devices and/or methods have been used and proposed to signal the removal of the coin box from a coin telephone. However, these devices are generally complex, difficult to construct and utilize, and are prone to fail. Specifically, prior art switch devices are ineffective at providing accurate and precise indications of coin box removal. Still others are prone to wear out over time and require frequent replacement.

Despite the need for a contact switch device and/or method in the art which is simple to construct and utilize, which is reliable and which is durable, and which overcomes the limitations and problems of the prior art, none insofar as is known has been proposed or developed.

Accordingly, it is an object of the present invention to provide a contact switch device which is simple to construct, install and utilize. Another object of this invention is to provide a contact switch which is accurate, precise, reliable and durable. Particular objects of this invention are to provide a contact switch which has a low profile and is constructed of an elastomeric material. Finally, it is an object of this invention to provide a contact switch which is useable in the telephone industry to indicate the removal of a coin collection box from the box vault of a coin operated public telephone.

SUMMARY OF THE INVENTION

The present invention provides a low profile, elastomeric article proximity switch for use in pay telephones to detect the removal of a coin box therefrom. The article proximity switch basically comprises a printed circuit board, including at least two conductive circuit paths arranged in a predetermined pattern on a first surface of the printed circuit board, and a depressible elastomeric actuation structure connected to the printed circuit board and having a conductive contact member constructed and arranged so that it establishes conductive contact with and between each conductive circuit path of the printed circuit board upon depression of the actuation structure. The actuation structure further has a cupped configuration forming an interior cavity above the printed circuit board. The actuation structure comprises a base portion having a plurality of air channels, a key portion having a generally rectangular and continuous side wall extending vertically from the base portion, and a top portion extending from the side wall. The conductive contact is disposed on a bottom surface of the top portion, exposed in the actuation structure interior cavity. The top portion further has a centrally disposed actuation depression structure formed therein which extends downwardly into the actuation structure interior cavity a predetermined distance. The conductive contact is formed on a bottom surface of the actuation depression, and is exposed in the actuation structure interior cavity. The conductive contact is comprised of a conductor impregnated elastomeric substance. The actuation structure has a predetermined actuation stroke distance formed between the conductive contact and the printed circuit board conductive circuit means paths. The article proximity switch further comprises means to electrically connect the conductive circuit paths to an external electronic apparatus, and means to mount the printed circuit board to an external surface.

These and other benefits of this invention will become clear from the following description by reference to the drawings.

BRIEF DESCRIPTION OF THE DRAWINGS

FIG. 5 is a top plan view of the key structure of the article proximity switch;

FIG. 6 is a crossectional view elastomeric key structure of the switch, taken along line 6—6 of FIG. 5;

FIG. 7 is a bottom view of the key structure;

FIG. 8 is an end view of the key structure; and

DESCRIPTION OF THE PREFERRED EMBODIMENT

Figure 1:
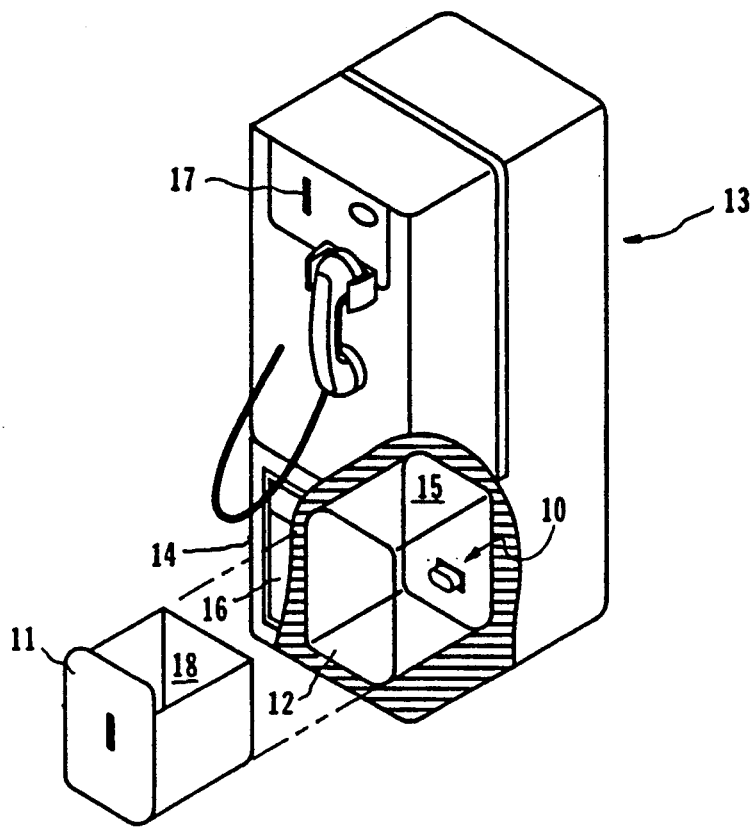
FIG. 1 is a perspective view, partially cut away, of a standard coin operated public telephone system utilizing the low profile elastomeric article proximity switch of the present invention.

FIG. 1 shows a standard coin-type public telephone station 13 to which the low profile, elastomeric contact switch 10 of the present invention is operatively connected. The coin telephone station 13 is shown to have, among other features, a coin collection box 11. The coin collection box 11 is shown in its removed or "out" state from the telephone station 13. Normally, the coin collection box 11 is disposed and locked in a coin box vault 12, which is a secure recess, typically located near the bottom front of the body 14 of the coin phone station 13. A coin return chute 14 is also shown disposed adjacent the coin box vault 12. When inserted in the coin box vault 12, the coin box 11 receives and stores collected coins deposited by the phone user. As known in the art, the phone station 13 has various mechanisms for transferring coins deposited in a coin slot 17 to the vault 12 location. Deposited coins may alternatively be routed to the coin return chute 16 as is known in the art.

In the instant example, the contact switch 10 is shown disposed on a back wall 15 of the coin box vault 12. The inserted coin collection box 11 has dimensions substantially co-extensive with those of the vault 12, such that the back wall 18 of the box 11 contacts and depresses the switch 10 when the box 11 is positioned fully inside the vault 12. In this mode, the switch 10, which is electrically connected with monitoring and indicating circuitry (not shown), establishes a closed circuit which is indicative of the box "in" condition. Conversely, removal of the coin box 11 from the vault 12 releases the switch 10, thereby establishing an open circuit which is indicative of the box "out" condition. The monitoring and indicating circuitry may be communicatively linked to a central office or other remote location which could utilize the box-in and box-out signals for security and/or accounting purposes. The location of the switch 10 is easily adjustable either on the back wall 15 or to some other location within the vault 12 to provide optimal and reliable coin box 11 movement indication in varying coin telephone station 13 structures. Moreover, it will be apparent that the teachings of this invention may be utilized in other applications, including switch applications not involving article proximity detection.

Figure 2:
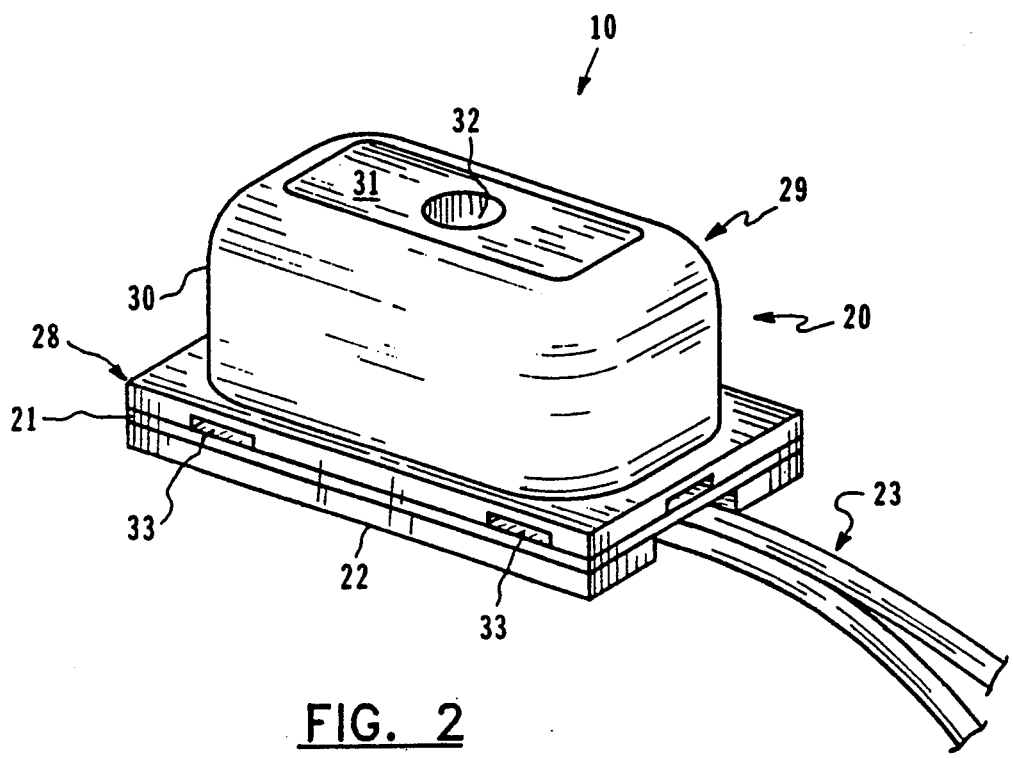
FIG. 2 is a perspective view of the article proximity switch shown in FIG. 1.
Figure 3:
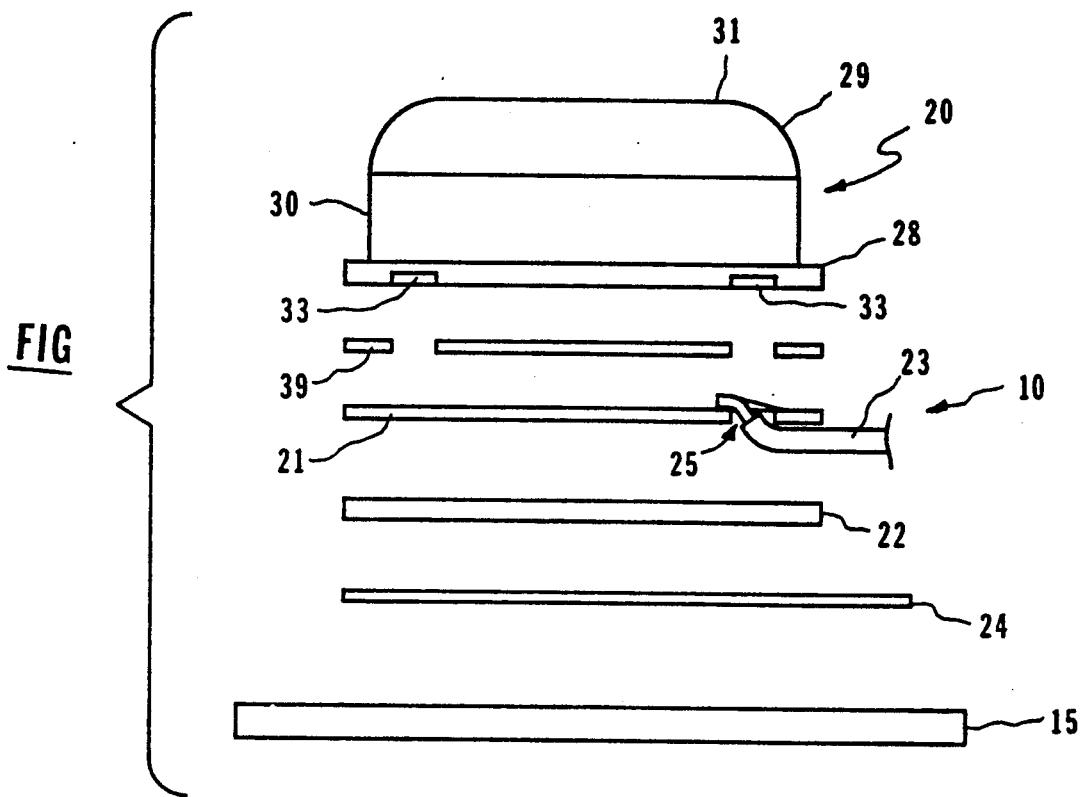
FIG. 3 is an exploded side view of the article proximity switch.

Referring to FIGS. 2 and 3, the contact switch 10 basically comprises an actuation structure 20, a printed circuit board (PCB) 21, a mounting member 22 and a pair of connection wires 23. The mounting member 22 preferably comprises a pressure sensitive adhesive layer such as doubled coated adhesive urethane foam tape. A hanger structure 24 may additionally be added depending upon the mounting environment of the coin box vault 12.

Figure 4:
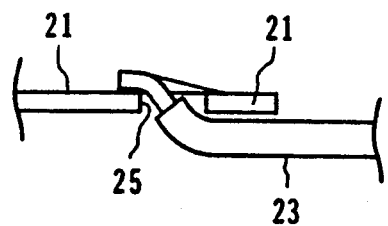
FIG. 4 is a detailed view of the PCB connection shown in FIG. 3.

The actuation structure or body 20 is shown to be a generally rectangular structure which is constructed of an elastomeric material such that it may be depressed and deform when in contact with an external structure or article, and will recoil and return to its original state (as shown) when such contact is removed or released. The printed circuit board 21 is a flat, planar structure which contacts and is substantially co-extensive with the bottom surface of the body 20. The mounting member 22 or members 22 and 24 are also flat planar structures which are disposed adjacent to and substantially co-extensive with the bottom surface of the PCB 21. The connection wires 23 are preferably insulated 20-22 gauge wires which are connected to the PCB 21 via a strain relief aperture 25 as shown in FIG. 4.

Figure 9:
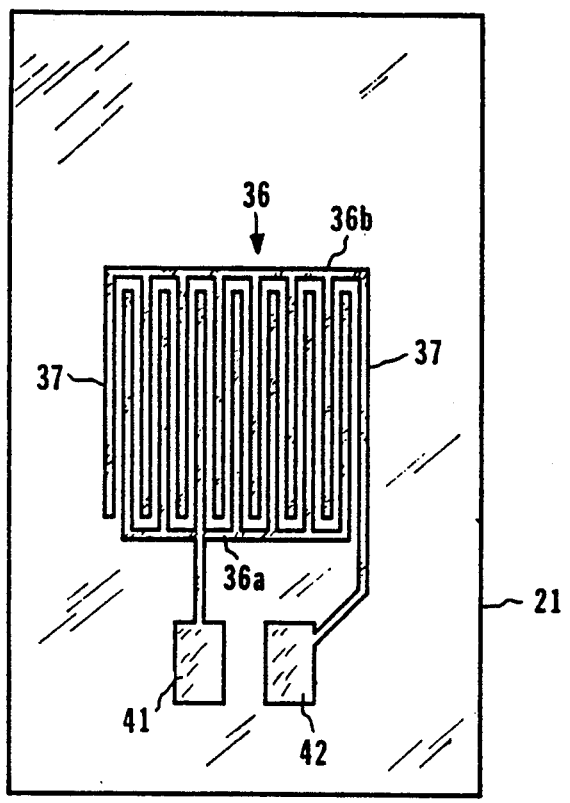
FIG. 9 is a top plan view of the printed circuit board of the article proximity switch, showing the printed circuit path pattern.

Referring also to FIG. 9, the PCB 21 has a pair of conductive circuit paths 36 a and b arranged in an interlocking pattern and disposed on its top surface. Each conductive path 36 a and b comprises a plurality of, preferably seven (7), conductive traces 37. The rectilinear traces 37 ar arranged in a staggered pattern, whereby they are interspaced and parallel to one another. The traces 37 of each separate conductive path 36 a and b are connected and merge at a node 41 or 42. However, the traces 37 are spaced a predetermined distance from one another so that no contact occurs between the separate paths 36 a and b. Preferably, the traces 37 and nodes 41 and 42 are constructed of gold flash over nickel-plated copper. Conductive carbon ink may alternatively be used.

Referring also to FIGS. 6-8, the actuation structure 20 has an inverted cupped configuration forming an interior cavity 34 above the printed circuit board 21. The actuation structure 20 comprises a base portion 28 and a key portion 29 with a generally rectangular and continuous side wall portion 30 extending vertically from the base portion 28, and a generally flat top portion 31.

The base portion 28 is shown to be a thin flat structure which extends outwardly from and at a right angle to the bottom of the side wall portion 30. The base portion is rectangular and provides a mating or connecting structure for the PCB 21. As best shown in FIG. 3, the base portion 28 may be connected to the PCB 21 via a layer of adhesive such as DOW Adhesive No. 732, for example. A plurality of elongated depressions 40 are shown disposed in the bottom surface of the base portion 28 to improve adhesion between the base 28 and the PCB 21. A plurality of air channels 33 are shown to be disposed in the base portion 28. The air channels 33 allow air passage from the interior 34 of the elastomeric body 20 to the environment to permit smooth and complete depression of the body 20 and recoil to its undepressed configuration upon removal of the depressing force.

A cylindrical depression member or slot 32 is formed in the top portion 31 and extends downwardly a predetermined distance into the interior cavity 34. Importantly, a conductive contact 35 is disposed on the bottom (interior) surface of the depression member 32. The conductive contact 35 is shown to have a circular configuration of a predetermined diameter approximately equal to the spacing between approximately half of the traces 37 of the conductive paths 36 a and b on PCB 21. The conductive contact 35 establishes a conductive connection between the traces 37 of the two conductive paths 36 a and b upon depression or actuation of the key portion 29 of the body 20. It is within the purview of this invention that additional depression members (not shown), for example 2 or 3, may be provided in the key portion 29.

Preferably, the depression member 32 extends downwardly a distance such that the stroke or travel distance, formed between the conductive contact 35 and the top surface of the PCB 21, for the actuation structure 20 is between 0.050 and 0.250 inches (0.13-0.64 cm.). The entire actuation structure 20 is preferably constructed of silicone rubber or a similar substance having a durometer reading of 40±5 Shore A. The resultant elastomeric structure 20 is depressible and deforms through the stroke distance to make communicative contact between the conductive contact 35 and the PCB 21 conductive paths 36 a and b. Moreover, communicative contact is maintained throughout additional or over-stroke depression of at least 0.4 inches (1.0 cm.). During switch over-stroke or over-travel, the depression member 32 undergoes deformation to maintain proper communicative contact. Moreover, utilizing the above described structure, reliable depression, deformation and recoil are provided through numerous actuation cycles and in a wide range of temperatures above −40 degrees fahrenheit (−40 degrees celsius).

Preferably, the conductive contact 35 is constructed of a conductive substance, such as carbon, which is impregnated into the elastomeric structure of the depression member 32. This structure provides a durable, resilient contact surface which provides required communicative connection over a variety of depression forces and over repeated depression and release cycles. Preferably, the conductive contact 35 yields a connective electrical resistance of less than 200 ohms when the actuation structure 20 is depressed by a force equivalent to that exerted by a mass of approximately 150 grams.

As many changes are possible to the embodiments of this invention utilizing the teachings thereof, the descriptions above, and the accompanying drawings should be interpreted in the illustrative and not the limited sense.

That which is claimed is:

1. An elastomeric proximity switch for use in pay telephones to detect the removal of a coin box therefrom, comprising:
   a) a printed circuit board, including at least two conductive paths arranged in a predetermined pattern on a first surface of said printed circuit board;

b) a depressible actuation structure, constructed of an elastomeric material having a durometer range of 40+/−5 shore A, connected to said printed circuit board and having a conductive contact constructed and arranged so that it establishes contact with and between each said conductive path of said printed circuit board upon depression of said actuation structure, said actuation structure having a cupped configuration forming an interior cavity above said printed circuit board, said actuation structure further comprising a base portion, a generally rectangular and continuous side wall portion extending perpendicularly from said base portion and curving inwardly at a top region, a flat top portion extending perpendicularly from said side wall portion, and a centrally disposed, columnar depression member formed on said top portion which extends downwardly into said actuation structure interior cavity a predetermined distance so as to form an actuation stroke distance between said conductive contact and said printed circuit board conductive paths, between 0.13 and 0.64 cm., said conductive contact being formed on a bottom surface of said depression member, and whereby said actuation structure is depressible and deforms through said stroke distance to make communicative contact between said conductive contact and said conductive paths, said communicative contact being maintained during additional depression through an overstroke distance of at least 1.0 cm., said depression member being deformed by said additional depression through said overstroke distance;

c) means to electrically connect said conductive paths to an external electronic apparatus; and d) means to mount said printed circuit board to an external surface.

2. The switch of claim 1, wherein there are two said conductive paths.

3. The switch of claim 2, wherein said predetermined pattern of said conductive paths includes a plurality of staggered, interspaced, and parallel rectilinear traces, said traces of each said conductive path further being linked to a node.

4. The switch of claim 3, wherein there are at least seven rectilinear traces in each said conductive path.

5. The switch of claim 3, wherein said conductive path traces consist of gold flash over nickel-plated copper.

6. The switch of claim 1, wherein said conductive contact is comprised of a conductor impregnated elastomeric substance.

7. The switch of claim 1, wherein said actuation structure recoils after depression to resume its initial non-deformed state, pressure differences between said actuation structure interior cavity and the external environment experienced during said depression and recoil being equilibrated via base portion air channels.

8. The switch of claim 1, wherein said conductive paths and said conductive contact have a communicative electrical resistance of less than 200 ohms when said actuation structure is depressed by a force equivalent to that which would be exerted by a mass of approximately 150 grams.

9. The switch of claim 1, wherein said means to electrically connect are 22 gauge insulated wires.

10. The switch of claim 1, wherein said means to mount is a double sided, pressure sensitive adhesive tape which is disposed on a second surface of said printed circuit board, opposite said first surface.

11. The switch of claim 10, wherein said means to mount further includes a hanger means, connected to said printed circuit board, and wherein the switch is mountable on a payphone system to detect removal of a coin box therefrom.

* * * * *